Figure 4:
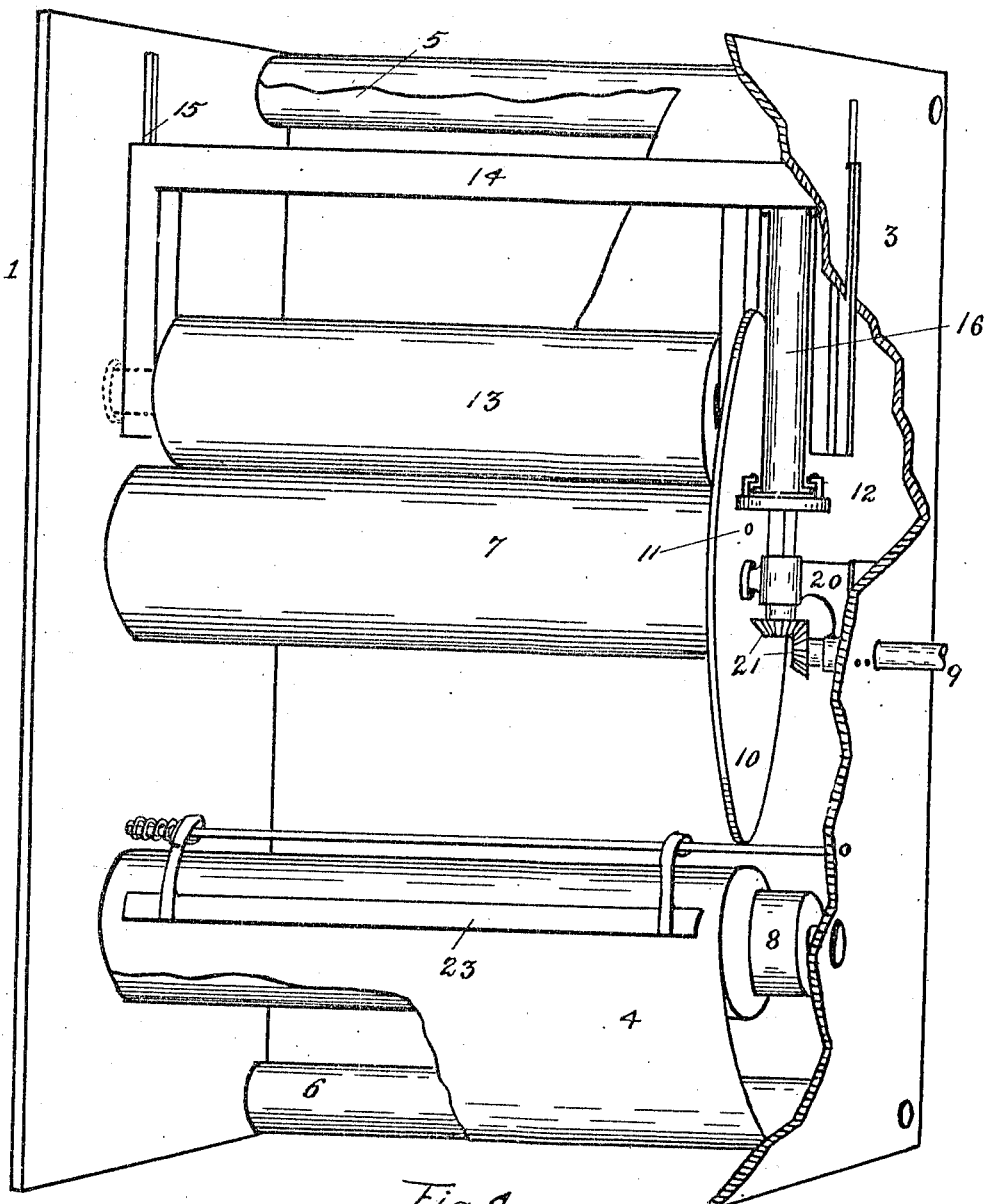

G. M. & H. S. BRADSHAW
STREET INDICATOR FOR VEHICLES.
APPLICATION FILED FEB. 29, 1912.
1,055,441.
Patented Mar. 11, 1913.
3 SHEETS—SHEET 1.
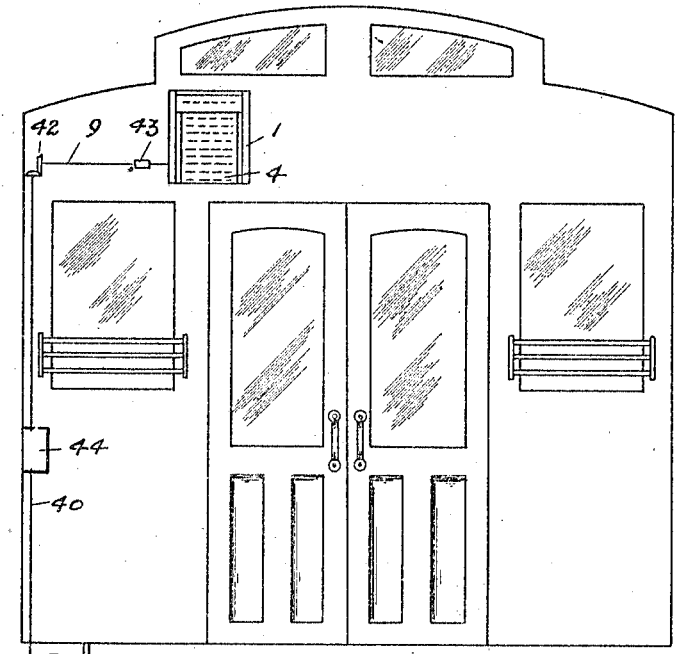
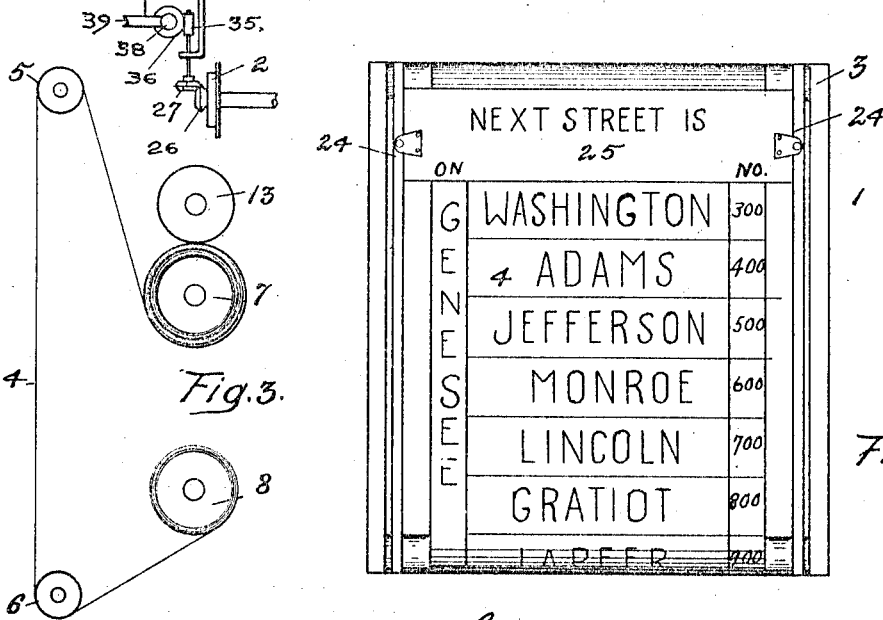
WITNESSES:
Christine A. Braidel.
Geo. W. Smith.
George M. Bradshaw
Hawley S. Bradshaw INVENTORS
BY
Geo. B. Willcox ATTORNEY G. M. & H. S. BRADSHAW
STREET INDICATOR FOR VEHICLES.
APPLICATION FILED FEB. 29, 1912.

1,055,441.

Patented Mar. 11, 1913.

3 SHEETS—SHEET 2.

WITNESSES:
Christine A. Braidel.
Geo. W. Smith.

George M. Bradshaw
Hawley S. Bradshaw INVENTORS

BY

Geo. B. Willcox. ATTORNEY

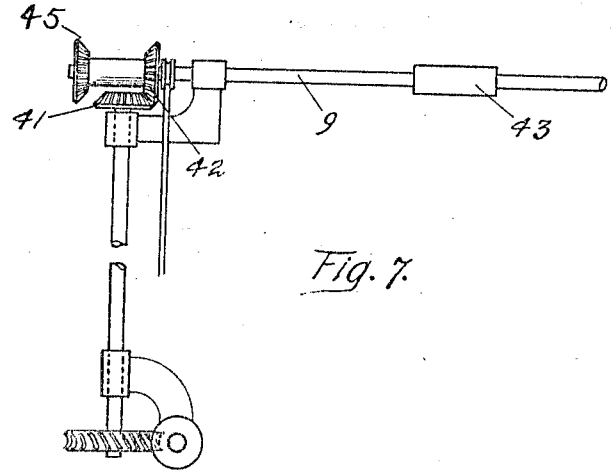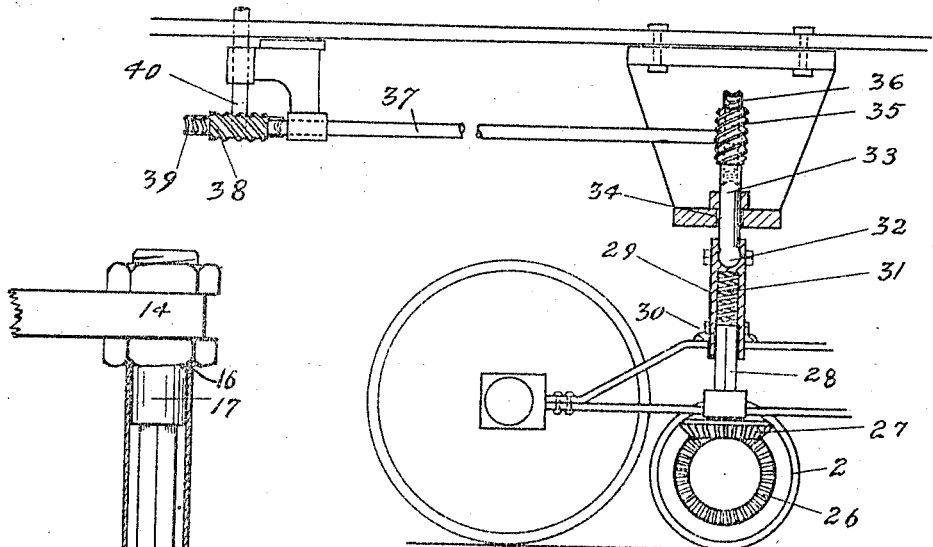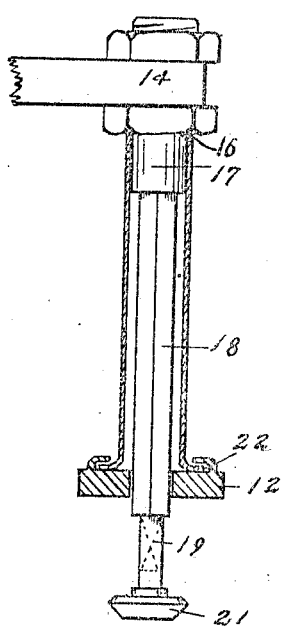

UNITED STATES PATENT OFFICE.

GEORGE M. BRADSHAW AND HAWLEY S. BRADSHAW, OF FLINT, MICHIGAN.

STREET-INDICATOR FOR VEHICLES.

1,055,441.  Specification of Letters Patent.  Patented Mar. 11, 1913.

Application filed February 29, 1912. Serial No. 680,640.

*To all whom it may concern:*

Be it known that we, GEORGE M. BRADSHAW and HAWLEY S. BRADSHAW, both citizens of the United States, residing at Flint, in the county of Genesee and State of Michigan, have invented certain new and useful Improvements in Street-Indicators for Vehicles; and we do hereby declare the following to be a full, clear, and exact description of the invention, such as will enable others skilled in the art to which it appertains to make and use the same.

This invention is a street and station indicator for use on street cars, railroad trains, and similar vehicles.

It pertains particularly to that class of street indicators in which the name of the next street intersection is automatically indicated by a display device located in the car, the indicator mechanism being operated from the car wheel or wheel running on a rail beneath the car.

Our present invention pertains more particularly to the recording mechanism and the means by which it is actuated.

The advantages of our invention are to provide in an indicating mechanism of the class described, a device whereby not only the next street will be automatically indicated, but also several streets ahead. The street on which the car is traveling and the numbers of the blocks as approached are also indicated. If the car approaches the next street, but before reaching it is backed for say two or three blocks and then run ahead, we provide means whereby the sequence of street indications will remain undisturbed, so that when the car returns to the place from which it commenced to back, the indicating mechanism will be restored to its proper position, without resetting the operating mechanism of the indicator by hand.

Our preferred form of indicator comprises a pair of rolls, the names of the streets being inscribed on a belt that unwinds from one roll to the other; and our invention comprises means whereby the speed of the winding roll is automatically reduced as its diameter increases with the winding of the belt.

Our invention also comprises numerous novel details of construction which will be more fully set forth.

With the above and certain other objects in view which will appear later in the specifications, our device consists in the mechanisms described in the specifications and pointed out in the claims, and the equivalents thereof.

In the drawings, Figure 1 is a diagrammatic view showing the device applied to the front of a street car; Fig. 2 is a front view of the indicator; Fig. 3 is a diagrammatic view showing the belt; Fig. 4 is a rear interior view of the indicator in perspective, parts being broken away; Fig. 5 is a detail of the driving device shown in Fig. 4; Fig. 6 is a side elevation of the power connections to the driving wheel; Fig. 7 is a side elevation of the upper shaft connections and the reversing mechanism of the indicator.

As is clearly shown in the drawings, the device consists in an indicator 1, the mechanism of which is actuated by suitable connections with wheel 2.

The indicator consists in a case 3 within which is mounted a belt 4 bearing the names of the streets. The belt passes along the front of the indicator, over a roller 5 at the top of the case and over a roller 6 at the bottom of the case.

7 is the receiving roller and 8 is the delivery roller. The receiving roller is actuated by a horizontal shaft 9 through the medium of a mechanism adapted to compensate for the increasing diameter of roller 7 as the car proceeds. This compensating mechanism will now be described.

10 is a friction disk removably secured by means of a pin 11 to one end of the roller 7, so that when disk 10 is turned, the roller will turn. A friction wheel 12 drives disk 10. Means is provided for rotating friction wheel 12 and for simultaneously moving it radially outward from the center of disk 10 so that for a constant speed of rotation of friction wheel 12, the rotating speed of roller 7 decreases as wheel 12 moves outward. To move wheel 12 outward so as to produce a constant peripheral speed of roller 7 as it increases in diameter, and therefore to maintain a constant speed of belt 4 with relation to shaft 9, we provide a roller 13 arranged in vertical guides so as to ride on the belt as it winds upon roller 7. Roller 13 is preferably journaled in a vertically movable frame mounted in suitable guides 15 on the case 3. Secured to one end of the frame is a cylindrical tube 16. We prefer to secure tube 16 to the frame so that the tube may be vertically adjusted in the frame. To this end we provide two lock nuts, one above and one below frame 14, the lock nuts being threaded to the tube. The purpose of this vertical adjustment is to enable wheel 12 to be radially adjusted with reference to disk 10 to compensate for reduction in diameter of wheel 12, due to wear or to wear of any other parts of the mechanism that would affect the speed ratio of the car and the belt.

Within tube 16 is slidingly received the circular end 17 of a square shaft 18, the lower end of shaft 18 being rounded as at 19 and mounted in a suitable bearing 20, being revolved by means of shaft 9 through a pair of beveled pinions 21. Wheel 12 is swiveled to the lower flanged end of tube 16 by means of flanges 22 on the wheel 12, as shown in Fig. 5.

Wheel 12 is provided with a square hole through which square shaft 18 passes, and is slidable on the shaft, moving up and down with frame 14. It is obvious that frame 14 will rise as the diameter of roller 7 increases and that friction wheel 12 will impart a continually decreasing speed to roller 7, although the speed of shaft 9 may remain constant.

To prevent too rapid unwinding of belt 4 from roller 8 we provide on roller 8 a spring-pressed bar 23 to act as a slight drag on the belt 4 and to maintain the front or exposed portion of the belt taut.

On the front of the case and mounted to slide in suitable guides 24 is a plate or equivalent device 25 which can be moved up or down along the face of the indicator so as to expose at its lower end and thus indicate as the next street, any one of the names shown on the front of the indicator. The object of this plate is to enable the conductor to correctly indicate the next street if, for any reason, the sequence of the streets has been changed by extra traveling of the car, as for instance, by running out on a side track and back again.

The preferred form of mechanism by which the indicator is driven is illustrated in Figs. 6 and 7, where the wheel 2 is provided with a bevel pinion 26 meshing with a similar pinion 27 which is connected to a vertical shaft 28. This shaft is preferably of square cross-section and its upper end is slidingly received in a tube 29, the interior of which is preferably of square cross-section so that the shaft 28 may move up and down within the tube 29, the tube revolving in a bearing 30 preferably carried by the car truck frame. A compression spring 31 maintains the shaft 28 in proper relation to the tube 29. At the upper end of the tube is the ball joint 32 of a short vertical shaft 33 which revolves in a bearing 34 on a bracket carried by the car frame.

The upper end of shaft 33 is provided with a worm 35 engaging a worm wheel 36. This worm wheel, acting through horizontal shaft 37 carried in bearings fixed to the car frame, worm 38 on shaft 37, worm wheel 39, vertical shaft 40, and beveled pinions 41 and 42, actuates said shaft 9 as previously described.

The motion of shaft 9 may be stopped or reversed if desired, by shifting pinions 42 and 45, to throw the shaft out of action. The object of pinions 42 and 45 is to provide means for reversing the motion of rod 9 with reference to the forward or backward movement of the car, so that should the car be backed over the route or over any considerable part of it, as for instance on the return trip where the car has not been turned around, the rod 9 may be made to revolve in the same direction as when traveling forward. In this case the belt is made of sufficient length to contain the names of all the streets on the out trip and also the same names in reverse order for the return trip.

A clutch 43 of any suitable construction may be provided between the pinion 42 and indicator 1, the clutch being preferably adapted to permit nearly one complete revolution of gears 42 and 45 without moving the belt.

In practice we prefer to arrange the ratio of car movement to the movement of the belt, so that at least three or four blocks may be traversed by the car for one revolution of the shaft 9, so that it is possible by means of the clutch 43 to back the car on a siding for a distance of several blocks without moving the belt, and when the car again returns to its original position, clutch 43 will engage and the indicator will resume its operation at that point.

It will be seen from the above description that a given number of rotations of wheel 2 corresponds to a certain definite amount of movement of the belt 4 so that if the length of the blocks is constant, the belt will indicate the streets correctly.

Where the blocks differ in length the spaces for street names on the belt 4 are made sufficiently wide or narrow to correspond with the length of the block.

In traveling from the city to a rural district where road intersections are long distances apart, we place a suitable speed-reducing device 44 on shaft 40 by which the speed of the upper part of shaft 40 may be varied to suit the desired speed of shaft 9 and of the belt, to conform with the distances between the rural road intersections.

Since the details of the speed-reducing mechanism 44 form no part of our present invention we have not illustrated such mechanism in the drawings.

By the means above described we have produced a street indicator that is simple in construction, not liable to get out of order, and adapted to meet the requirements of practice.

Having described our invention, what we claim and desire to secure by Letters Patent, is:—

1. In a car indicator of the class described, a movable belt bearing street names and block numerals uniformly spaced, a receiving roller and a delivery roller; a riding roller resting upon the belt on the receiving roller, a vertically movable frame carried by said riding roller, a friction disk attached to the end of said receiving roller, a friction wheel carried by said vertically movable frame and engaging said disk, said disk loosely swiveled upon said frame and radially movable therewith, a drive shaft slidably engaging said friction wheel and adapted to rotate said wheel while permitting vertical movement of said wheel, and means adapted to rotate said drive shaft at a rate proportionate to the forward movement of the car.

2. In a car indicator having a case carrying vertical guides, a moving belt, a receiving roller and a delivery roller for said belt, a vertically movable frame carried by said guides, a tube carried by said frame, a riding roller journaled in said frame and in contact with the belt on the receiving roller, a friction disk on the receiving roller, a friction wheel carried by said tube and in engagement with said disk, and means for revolving said friction wheel while permitting its radial movement with relation to said disk.

In testimony whereof, we affix our signatures in presence of two witnesses.

GEO. M. BRADSHAW.
HAWLEY S. BRADSHAW.

Witnesses:
P. E. VERNON,
WILLIAM T. HYNES.